(12) United States Patent
Zhao et al.

(10) Patent No.: US 10,378,612 B2
(45) Date of Patent: Aug. 13, 2019

(54) BEVEL GEAR SET AND METHOD OF MANUFACTURE

(71) Applicant: GM GLOBAL TECHNOLOGY OPERATIONS LLC, Detroit, MI (US)

(72) Inventors: Shaun X. Zhao, Novi, MI (US); Bhapinder Puri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 15/216,786

(22) Filed: Jul. 22, 2016

(65) Prior Publication Data

US 2017/0261068 A1   Sep. 14, 2017

Related U.S. Application Data

(60) Provisional application No. 62/305,159, filed on Mar. 8, 2016.

(51) Int. Cl.
*B23P 15/14* (2006.01)
*F16H 1/14* (2006.01)
(Continued)

(52) U.S. Cl.
CPC .............. *F16H 1/14* (2013.01); *B23F 9/082* (2013.01); *B23F 9/10* (2013.01); *B23F 19/108* (2013.01);
(Continued)

(58) Field of Classification Search
CPC ........ F16H 1/14; F16H 55/0846; F16H 55/17; F16H 55/0853; F16H 1/18; F16H 1/145;
(Continued)

(56) References Cited

U.S. PATENT DOCUMENTS 2,078,124 A * 4/1937 Condon ............... B23F 19/101
  409/9
3,580,029 A * 5/1971 Daniel .................. B21H 5/022
  29/893.32
(Continued)

FOREIGN PATENT DOCUMENTS

CN     105081713 A    11/2015
CN     105983847 A    10/2016
(Continued)

OTHER PUBLICATIONS

Horst, Bruce; "A Basic Guide to Deburring and Chamfering Gears"; Jul. 1995 (Year: 1995).*
(Continued)

*Primary Examiner* — Ryan J. Walters
(74) *Attorney, Agent, or Firm* — Quinn IP Law

(57) ABSTRACT

A bevel gear set and a method of manufacturing the same are provided. The bevel gear set may include a first bevel gear and a second bevel gear. The first and second bevel gears may be spiral bevel gears or hypoid spiral bevel gears. The first and second bevel gears may each have a gear tooth surface having a plurality of teeth formed thereon, such that the teeth of the first bevel gear and the teeth of the second bevel gear are configured to engage in a meshing engagement. The teeth are machined onto the respective gear tooth surface via a face milling process. Each tooth includes a tooth top, a plurality of meshing surfaces, and at least one chamfer. The chamfer may be formed at an abutment edge disposed between the tooth top and a respective meshing surface via a brushing process directly following the machining of the teeth.

9 Claims, 4 Drawing Sheets

(51) Int. Cl.
*B23F 9/08* (2006.01)
*B23F 9/10* (2006.01)
*B23F 19/10* (2006.01)
*F16H 1/18* (2006.01)
*F16H 55/17* (2006.01)
*F16H 55/08* (2006.01)
*B24C 1/10* (2006.01)
*B23F 19/02* (2006.01)
*B23F 19/06* (2006.01)
*B23F 19/12* (2006.01)

(52) U.S. Cl.
CPC ............... *B23P 15/14* (2013.01); *B24C 1/10* (2013.01); *F16H 1/145* (2013.01); *F16H 1/18* (2013.01); *F16H 55/0846* (2013.01); *F16H 55/0853* (2013.01); *F16H 55/17* (2013.01); *B23F 19/02* (2013.01); *B23F 19/06* (2013.01); *B23F 19/12* (2013.01); *F16H 2055/0866* (2013.01)

(58) Field of Classification Search
CPC .. F16H 2055/0866; B24C 1/10; B23F 19/108; B23F 9/10; B23F 9/082; B23F 19/12; B23F 19/06; B23F 19/02; B23P 15/14
See application file for complete search history.

(56) References Cited

U.S. PATENT DOCUMENTS 5,133,627 A * 7/1992 Lindsey ............... B23F 19/102
                                                                                                      409/26
5,911,780 A * 6/1999 Hamasaka ............... B24C 1/10
                                                                                                      29/90.7

FOREIGN PATENT DOCUMENTS

| JP | H06339811 A | 12/1994 |
| JP | H06341508 A | 12/1994 |
| JP | 2002046030 A | 2/2002 |

OTHER PUBLICATIONS

Machine Translation of Zhang; CN105081713A; Nov. 2015 (Year: 2015).*

* cited by examiner

BEVEL GEAR SET AND METHOD OF MANUFACTURE

CROSS-REFERENCE TO RELATED APPLICATIONS

This application claims the benefit of U.S. Provisional Application No. 62/305,159, filed Mar. 8, 2016, which is hereby incorporated by reference in its entirety.

TECHNICAL FIELD

The disclosure relates to bevel gears, such as those used in vehicles, equipment, and the like, and a method of manufacturing and forming the same.

BACKGROUND

Bevel gears are utilized in vehicular, equipment, and other like applications. Among known bevel gears are helical bevel gears, spiral bevel gears, hypoid bevel gears and the like. Spiral bevel gears and hypoid bevel gears alike are typically manufactured by generating the tooth profile, for example, by cutting, milling, hobbing, or forming, e.g., by forging. Bevel gear tooth profiles are most commonly generated by using CNC gear cutting machines, special cutters, and complex programming strategies.

SUMMARY

A bevel gear set and a method of manufacturing the same are provided. The bevel gear set may include a first bevel gear and a second bevel gear. Each of the first bevel gear and the second bevel gear may be a spiral bevel gear. Each of the first bevel gear and the second bevel gear may further be a hypoid spiral bevel gear.

The first bevel gear may be disposed on a first bevel gear axis. The first bevel gear may have a first gear tooth surface having a plurality of teeth formed thereon. Each tooth of the first plurality of teeth extends outwardly and radially from the first bevel gear axis.

The second bevel gear may be disposed on a second bevel gear axis. The second bevel gear may have a second gear tooth surface having a plurality of teeth formed thereon. Each tooth of the second plurality of teeth extends outwardly and radially from the second bevel gear axis.

The first plurality of teeth is configured to engage with the second plurality of teeth, such that when engaged the first plurality of teeth and second plurality of teeth are engaged in a meshing engagement.

Each tooth of each of the first plurality of teeth and the second plurality of teeth includes a tooth top, a plurality of meshing surfaces, and a chamfer. The tooth top may have a length. The plurality of meshing surfaces may include a first meshing surface and a second meshing surface, such that each of the first meshing surface and second meshing surface of the respective tooth abut the tooth top at an abutment edge. Each meshing surface may further include a tooth face and a tooth flank, such that the tooth face abuts the tooth top at the abutment edge.

The chamfer may be formed at the abutment edge and extend along the tooth top length. The chamfer may be dimensioned such that the chamfer has a first chamfer dimension that is substantially equivalent to the tooth top length and a second chamfer dimension.

The respective bevel gears of the bevel gear set may be formed via the method of manufacturing disclosed herein, which includes the following steps: providing an annular gear blank; machining a plurality of radially and outwardly extending gear teeth into the gear tooth surface of the bevel gear via a face milling process; forming at least one chamfer on each tooth, such that each chamfer is disposed on an abutment edge formed between the respective meshing surface and the tooth top via an automated brushing process; applying a heat treating process to the bevel gear; finishing the bevel gear; and applying a shot peening process to the bevel gear.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
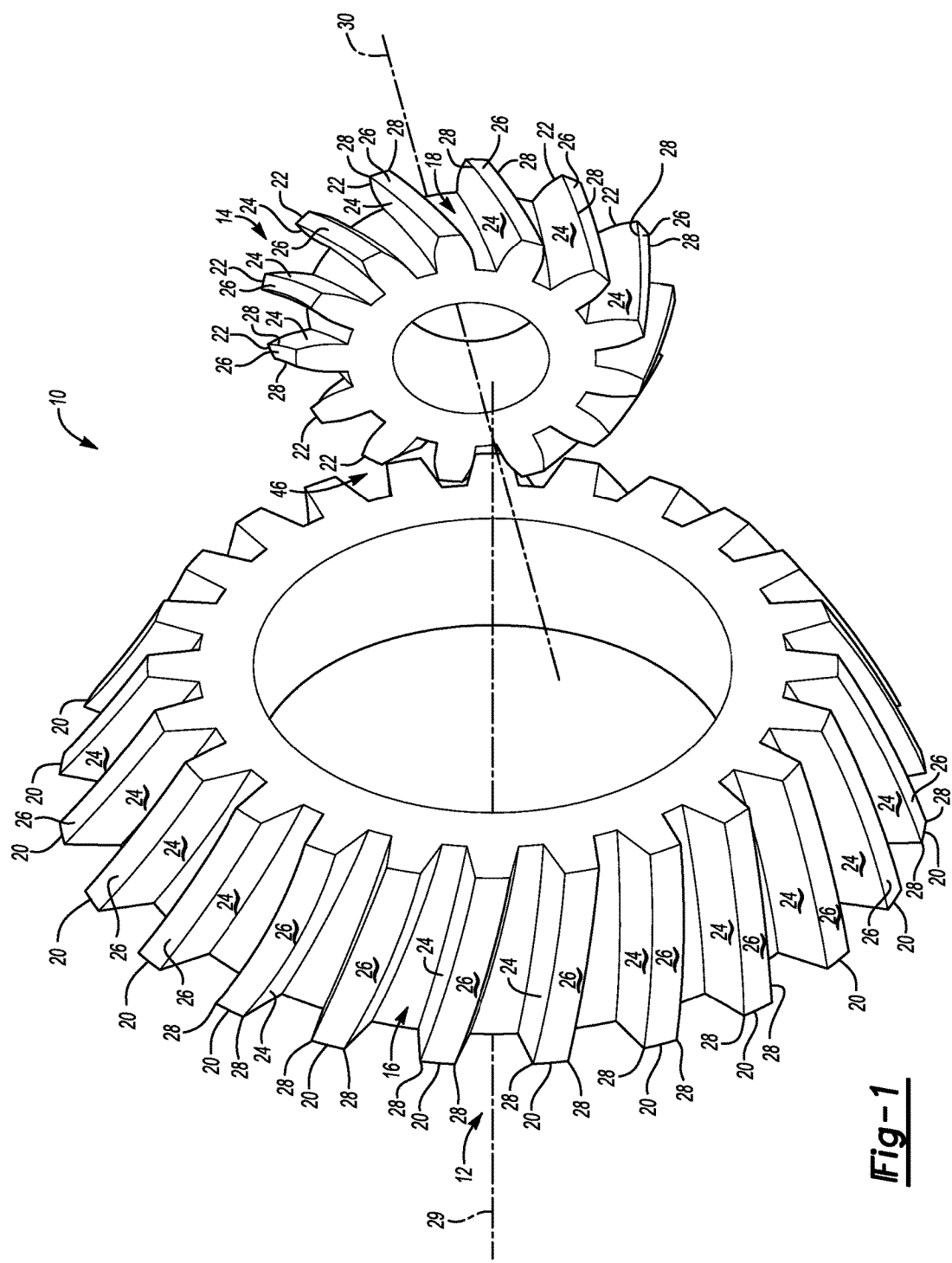
FIG. 1 is a schematic perspective view of an example spiral bevel gear set.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Referring to the drawings, wherein like reference numerals refer to like components throughout the several views, a bevel gear set 10 and a method of manufacturing 100 the same are provided.

The bevel gear set 10 may include a first bevel gear 12 and a second bevel gear 14. The first bevel gear 12 may be disposed on a first bevel gear axis 29. The first bevel gear 12 may have a first gear tooth surface 16 having a first plurality of teeth 20 formed thereon. Each tooth of the first plurality of teeth 20 extends outwardly and radially from the first bevel gear axis 29. The second bevel gear 14 may be disposed on a second bevel gear axis 30. The second bevel gear 14 may have a second gear tooth surface 18 having a second plurality of teeth 22 formed thereon. Each tooth of the second plurality of teeth 22 extends outwardly and radially from the second bevel gear axis 30. The first plurality of teeth 20 is configured to engage with the second plurality of teeth 22, such that, when engaged, the first plurality of teeth 20 and second plurality of teeth 22 are engaged in a meshing engagement 46.

Each of the first bevel gear 12 and the second bevel gear 14 may be a spiral bevel gear (FIG. 1). Spiral bevel gears typically have a generally annular gear body having a gear tooth surface 16, 18 including a plurality of radially outwardly extending or helical gear teeth 20, 22. The form of the gear tooth 20, 22 of each of the first bevel gear 12 and the second bevel gear 14 may be, for example, one of a straight type, a spiral type, and a hypoid type.

Each of the first bevel gear 12 and the second bevel gear 14, when formed as a spiral bevel gear (FIG. 1) may be formed as a right hand spiral bevel gear or a left hand spiral bevel gear depending on the application. In a left hand spiral bevel gear the outer half of a tooth is inclined in the counterclockwise direction from an axial plane through the midpoint of the tooth (FIG. 1). In a right hand spiral bevel gear the outer half of a tooth is inclined in the clockwise direction from the axial plane through the midpoint of the tooth (FIG. 2).

Further, when formed as a spiral bevel gear set 10, as shown in FIG. 1, the first bevel gear axis 29 and the second bevel gear axis 30 are configured to intersect. An example application for such a configuration is in a vehicle differential, where the direction of drive from the drive shaft must be turned substantially orthogonal to drive the wheels.

Figure 2:
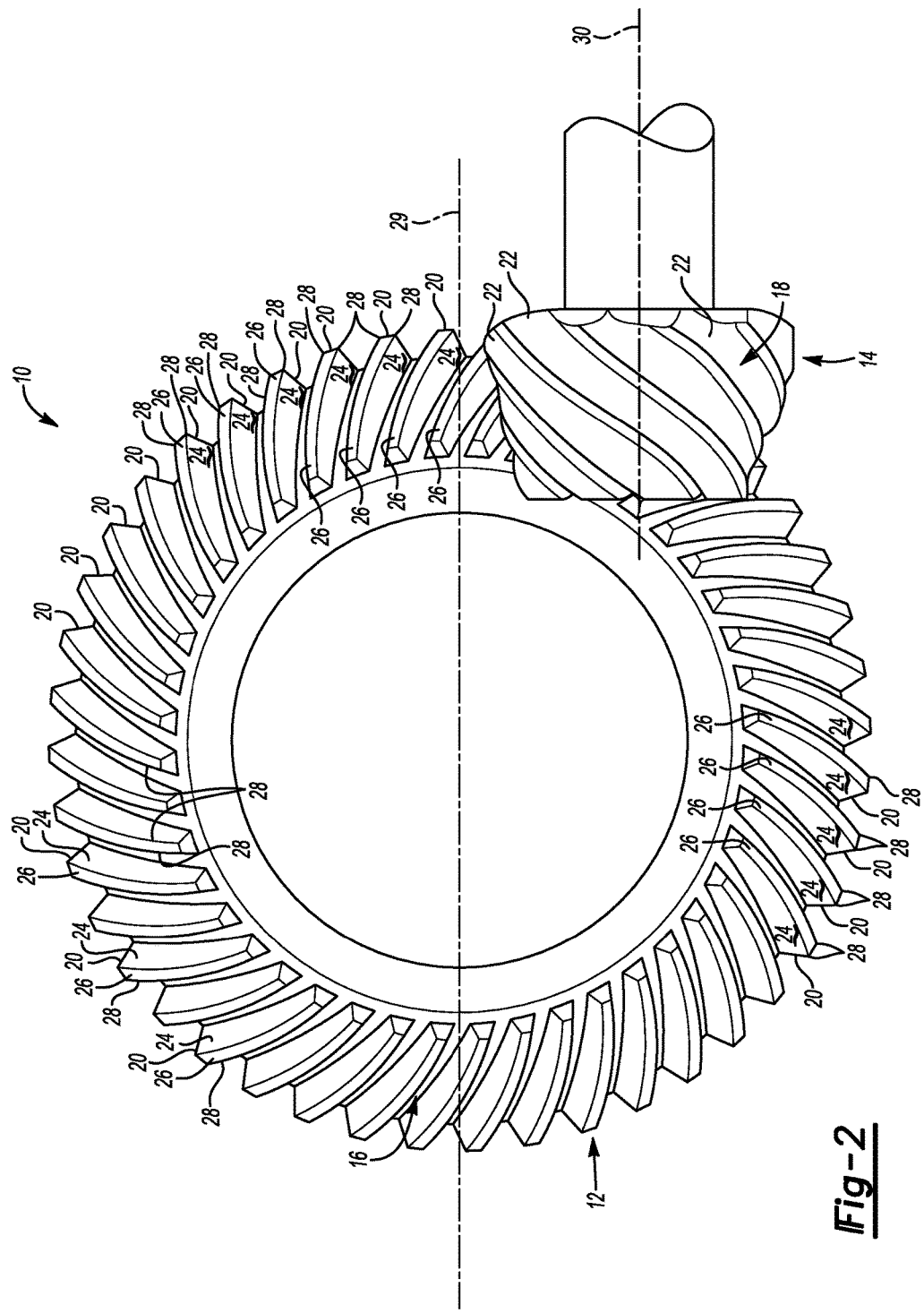
FIG. 2 is a schematic plan view of an example hypoid spiral bevel gear set.

Each of the first bevel gear 12 and the second bevel gear 14 may be formed as a hypoid spiral bevel gear, as shown in one example form in FIG. 2. While hypoid gears are similar in their general form to spiral bevel gears, hypoid gears differ by having spiral teeth that are curved and oblique, where the pitch surface of the tooth is a hyperboloid of revolution. Hypoid gears operate on non-intersecting axes. As such, when formed as a hypoid spiral bevel gears 12, 14, as shown in FIG. 2, the first bevel gear axis 29 and the second bevel gear axis 30 are non-intersecting. An example application for such a configuration is in a vehicle differential in larger trucks, sport utility vehicles, and the like, as hypoid spiral bevel gear sets are capable of transmitting higher torque than strict spiral bevel gear sets. The greater the offset of the first bevel gear axis 29 and the second bevel gear axis 30, the higher the torque transmitted between the first bevel gear 12 and the second bevel gear 14.

Each of the first bevel gear 12 and the second bevel gear 14 may be formed via one of a face milling process and a face hobbing process. In the example embodiment, each of the first bevel gear 12 and second bevel gear 14 are formed via a face milling process with a multi-bladed face milling cutter or the like. As such, in one instance, a gear blank or work piece is selected and turned relative to the rotating cutter to make one inter-tooth groove, and the cutter is then subsequently withdrawn and the blank or work piece is indexed into a position for cutting of the next tooth. In another instance, the cutting machine rotates both the cutter and the gear blank at predetermined relative speeds and without indexing.

Referring to FIGS. 1-7, each tooth of each of the first plurality of teeth 20 and the second plurality of teeth 22 may include a tooth top 26, a plurality of meshing surfaces 24, and at least one chamfer 40.

The tooth top 26 may be positioned distal to the respective first bevel gear axis 29 and the second bevel gear axis 30 and may further compose the outermost portion of the gear tooth surface 16, 18. The tooth top 26 may further have a length 50.

The plurality of meshing surfaces 24 may include a first meshing surface 24a (FIGS. 3 and 5) and a second meshing surface 24b (FIGS. 3 and 5), such that each of the first meshing surface 24a and second meshing surface 24b of the respective tooth 20, 22 abut the tooth top 26 at an abutment edge 28. Each meshing surface 24 may further include a tooth face 32 and a tooth flank 34, such that the tooth face 32 abuts the tooth top 26 at the abutment edge 28.

Figure 5A:
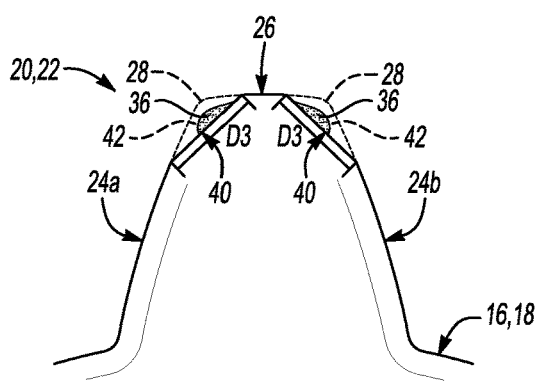
FIG. 5A is a schematic cross-section view of an example gear tooth formed with a chamfer between each of the respective tooth faces and the respective tooth top.
Figure 5B:
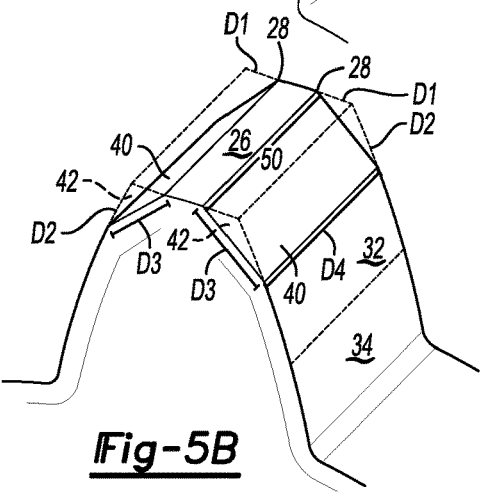
FIG. 5B is a schematic perspective view of an example gear tooth formed with a chamfer between each of the respective tooth faces and the respective tooth top.
Figure 6:
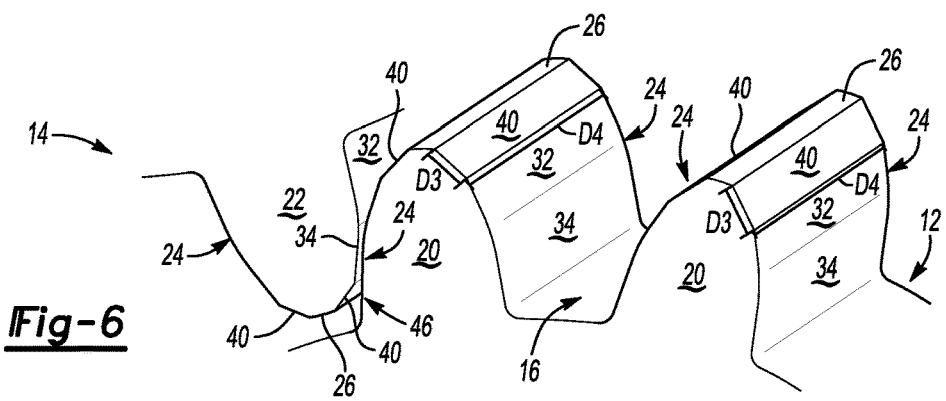
FIG. 6 is a schematic perspective view of a selected plurality of teeth on an example bevel gear set, wherein the selected plurality of teeth is formed with a chamfer between the tooth faces of each tooth and the respective tooth top.
Figure 7:
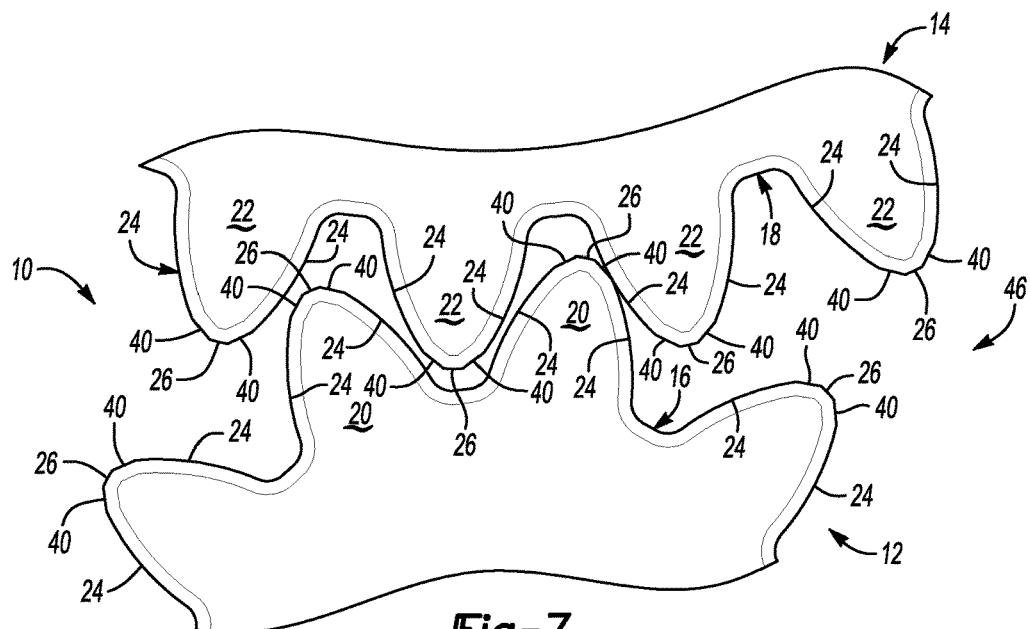
FIG. 7 is a schematic elevation view of a selected plurality of teeth on an example bevel gear set, wherein the teeth are in an example meshing engagement, and wherein the selected plurality of teeth are formed with a chamfer between the faces of each tooth and the respective tooth top.

Each tooth 20, 22 may have at least one chamfer 40. As shown in FIGS. 5-7, each tooth 20, 22 may have two chamfers 40. The at least one chamfer 40 may be formed at the abutment edge 28 and extend along the tooth top length 50. The chamfer 40 may be formed via the removal of a chamfer area 42 (FIGS. 5A and 5B) of the respective tooth 20, 22 at the abutment edge 28. The chamfer area 42 is defined as the area of tooth 20, 22 removed due to the formation of the chamfer 40 on the respective tooth 20, 22. The chamfer area 42 may have four dimensions, a first chamfer area dimension D1 (FIG. 5B), a second chamfer area dimension D2 (FIG. 5B), and a third chamfer area dimension D3 (FIGS. 5A, 5B, and 6), and a fourth chamfer area dimension D4, which corresponds to the face width of the gear tooth (FIGS. 5B and 6). The first chamfer area dimension D1 may be from about 0.10 millimeters to about 0.40 millimeters. More particularly, the first chamfer area dimension D1 may be about 0.25 millimeters. The second chamfer area dimension D2 may be from about 0.3 millimeters to about 0.7 millimeters. More particularly, the second chamfer area dimension D2 may be approximately 0.5 millimeters.

The at least one chamfer 40 may be formed on the respective tooth 20, 22 via a variety of processes including, but not limited to, one of an automated brushing process, a machining process, and a manual or hand process. In one example embodiment, the at least one chamfer 40 is formed by applying an automated brush to the abutment edge 28 of the tooth 20, 22 along the length 50 of the tooth top 26. The brush may be a metallic brush. Alternatively, the brush may be a non-metallic brush with an abrasion component, such as a brush having nylon bristles impregnated with an abrasive, such as aluminum oxide or silicon carbide. In another example embodiment, the at least one chamfer 40 may be formed via a machining process. For example, the at least one chamfer 40 may be formed via a computerized numerical control (CNC) machine, such that the computerized numerical control (CNC) machine cuts the respective chamfer 40 into the respective tooth 20, 22 at the respective abutment edge 28 utilizing a set of pre-recorded instructions.

Figure 8:
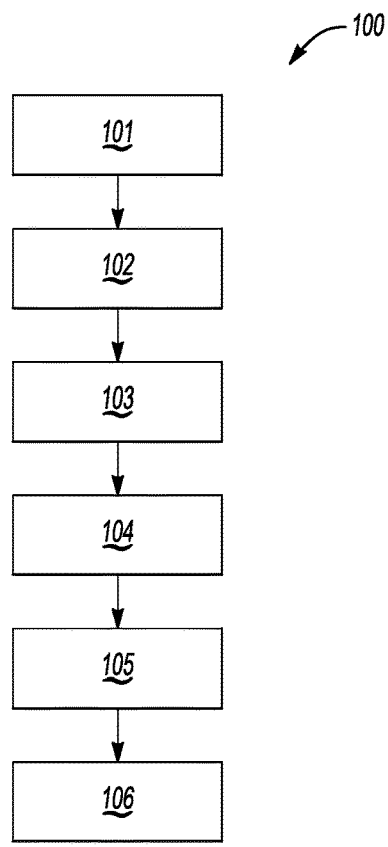
FIG. 8 is a flow diagram detailing the process of forming an example bevel gear.

A method 100 of forming a bevel gear 12, 14 having a gear tooth surface 16, 18, such as the first bevel gear 12 and the second bevel gear 14 of the bevel gear set 10, is also provided herein and detailed in the flow chart in FIG. 8. The method generally, comprises the steps of: providing an annular gear blank; machining a plurality of radially and outwardly extending gear teeth 20, 22 into the gear tooth surface 16, 18 of the bevel gear 12, 14; forming the at least one chamfer 40 on each tooth at the abutment edge 28 formed between the respective meshing surface 24 and the tooth top 26; heat treating the bevel gear 12, 14; shot peening the bevel gear; and finishing the bevel gear 12, 14.

First, at step 101, an annular gear blank or work piece is provided. At step 102, a plurality of radially and outwardly extending gear teeth 20, 22 are machined into the gear tooth surface 16, 18 of the bevel gear 12, 14 via a face milling process. Namely, the annular gear blank or work piece is acted on by a multi-bladed face milling cutter or the like. As such, in one instance, the annular gear blank or work piece is positioned relative to the rotating cutter. The cutter then cuts into the blank to make one inter-tooth groove. The cutter is then subsequently withdrawn and the blank or work piece is indexed into a position for cutting of the next tooth.

After each respective tooth 20, 22 is formed on the bevel gear 12, 14, at steps 101 and 102, at step 103, at least one chamfer 40 is formed on each tooth 20, 22. The at least one chamfer 40 is formed at the abutment edge 28 between the respective meshing surface 24 and the tooth top 26. The at least one chamfer 40 may formed on the respective tooth 20, 22 via an automated brushing process, such that the at least one chamfer 40 is formed by applying an automated brush to the abutment edge 28 of the tooth 20, 22 along the length 50 of the tooth top 26. The brush may be a metallic brush. Alternatively, the brush may be a non-metallic brush with an abrasion component, such as a brush having nylon bristles impregnated with an abrasive, such as aluminum oxide or silicon carbide.

At step 104, the bevel gear 12, 14 is subjected to a heat treating process. Heat treatment involves the use of heating or chilling, normally to extreme temperatures, to achieve a desired result such as hardening or softening of a material. In this example, the respective bevel gear 12, 14 is subjected to a heat treatment process in order to harden the respective material, such as steel or the like. Heat treatment techniques include annealing, case hardening, precipitation strengthening, tempering, normalizing, and quenching.

After being subjected to the heat treatment process at step 104, at step 105, the bevel gear 12, 14 may be finished via a metal surface finishing process. Surface finishing may include a broad range of industrial processes that alter the surface of a manufactured item to improve appearance, adhesion or wettability, solderability, corrosion resistance, tarnish resistance, chemical resistance, wear resistance, and hardness. Surface finishing may also modify electrical conductivity, remove burrs and other surface flaws, and control the frictional elements of the respective gear tooth surface 16, 18. In one example, the first and second bevel gears 12, 14 may be finished via a surface finishing process such as one of a shaving process, a rolling process, a grinding process, a honing process, and a lapping process.

At step 106, the respective bevel gear 12, 14 is subjected to a shot peening process. Shot peening is a cold metal working process used to produce a compressive residual stress layer and modify mechanical properties of metals and composites. Further, shot peening entails impacting a surface with shot, i.e., round metallic, glass, or ceramic particles, with a force sufficient to create plastic deformation. Plastic deformation induces a residual compressive stress in a peened surface, i.e., the gear tooth surface 16, 18, along with tensile stress in the interior of the respective gear component 12, 14. Peening a surface spreads it plastically, which causes changes in the mechanical properties of the surface.

Figure 3:
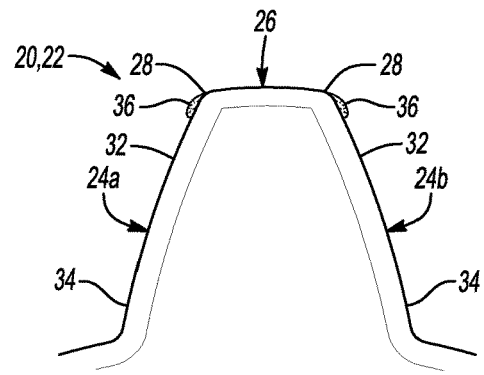
FIG. 3 is a schematic cross-section view of an example gear tooth.
Figure 4:
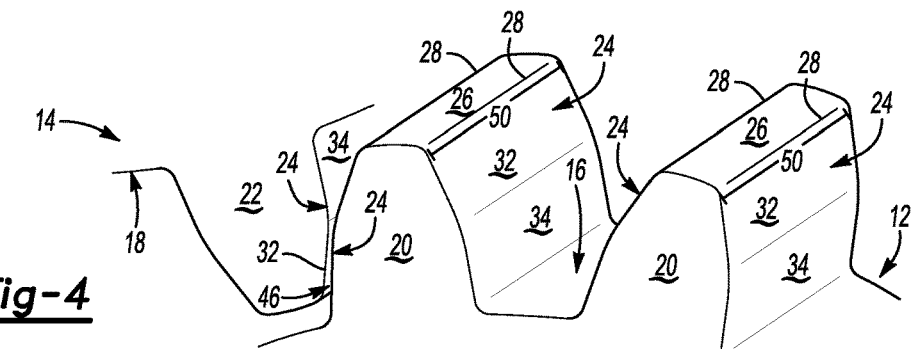
FIG. 4 is a schematic perspective view of a selected plurality of teeth on an example bevel gear set, wherein the teeth are in an example meshing engagement.

As shown in FIG. 3, when a bevel gear, such as the first bevel gear 12 and second bevel gear 14 disclosed herein, is subjected to a shot peening process, plastic deformation of the material near the abutment edge 28 can cause a plus tip 36, i.e., additional material at the abutment edge 28. This plus tip 36, as shown in FIG. 3 can alter the tooth profile and ultimately disrupt the meshing engagement 46 between the first plurality of gear teeth 20 and the second plurality of gear teeth 22. Disruption of the meshing engagement 46 between the first plurality of gear teeth 20 and the second plurality of gear teeth 22 can have adverse effects. In one example, a plus tip 36, such as the one shown in FIG. 3, can cause undesired wear of the gear tooth surface 16, 18 where the plus tip 36 meets the tooth profile, i.e., tooth face 32 and/or tooth flank 34, of the meshing gear. In another example, a plus tip 36, such as the one shown in FIG. 3, can cause a misalignment of the meshing engagement 46 between the first plurality of teeth 20 and the second plurality of teeth 22. In yet another example, a plus tip 36, such as the one shown in FIG. 3, can cause Noise, Vibration, and Harshness (NVH) issues in an application such as a vehicle, such as clicking when the plus tip 36 contacts the gear tooth surface 16, 18 of the meshing gear.

The addition of the at least one chamfer 40 to each of the teeth of the first plurality of teeth 20 and the second plurality of teeth 22, directly following the face milling process and in advance of the bevel gear 12, 14, being subjected to the heat treatment process and the shot peening process addresses these issues. As shown in FIGS. 5A and 5B, when a bevel gear, such as the first bevel gear 12 and second bevel gear 14 disclosed herein, is subjected to the shot peening process, plastic deformation of the material can cause a plus tip 36, i.e., additional material deformed onto the chamfer 40. Even though the plus tip 36, as shown in FIG. 5B may still be created during the shot peening process, the resultant plus tip 36 of FIG. 5B is contained within the chamfer area 42. The chamfer area 42 being defined as the area of tooth 20, 22 removed due to the formation of the chamfer 40 on the respective tooth 20, 22 at the abutment edge 28. As such, the tooth profile remains unchanged by the formation of the plus tip 36 within the chamfer area 42, as the formed plus tip 36, as shown in FIG. 5B will not contact the meshing gear teeth during the meshing engagement 46. As such, the creation of the chamfer 40 allows for improved gear life and gear wear as well as improved performance regarding Noise, Vibration, and Harshness (NVH) evaluations in an application such as a vehicle, as clicking between the first plurality of teeth 20 and the second plurality of teeth 22 is avoided during the meshing engagement 46, because the plus tip 36, as shown in FIG. 5B, is contained within the chamfer area 42.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method of forming a bevel gear having a gear tooth surface, the method comprising the steps of:
   providing an annular gear blank;

machining a plurality of radially and outwardly extending gear teeth into the gear tooth surface of the annular gear blank, wherein each tooth includes:
   a tooth top having a length; and
   a plurality of meshing surfaces, each meshing surface including a tooth face and a tooth flank, such that the tooth face abuts the tooth top at an abutment edge;
forming at least one chamfer on each tooth at the abutment edge via an automated brushing process:
   wherein the at least one chamfer is positioned between the respective meshing surface and the tooth top; and
   wherein forming the at least one chamfer comprises applying an automated brush to the abutment edge of the tooth along the length of the tooth top;
applying a heat treating process to the bevel gear; and
applying a shot peening process to the bevel gear and the gear tooth surface, wherein the shot peening process causes a plastic deformation of the gear tooth surface thereby creating a plus tip material, and wherein the plus tip material is contained on the chamfer.

2. The method of claim 1 wherein the method further includes finishing the bevel gear via one of a shaving process, a rolling process, a grinding process, a honing process, and a lapping process.

3. The method of claim 1 wherein forming the at least one chamfer on each tooth at the abutment edge further includes removing a chamfer area formed by the respective meshing surface and the tooth top, wherein the chamfer area is dimensioned such that the chamfer area has a first chamfer area dimension, a second chamfer area dimension, a third chamfer area dimension, and a fourth chamfer area dimension.

4. The method of claim 3 wherein the first chamfer area dimension is disposed along the tooth top and ranges from about 0.10 millimeters to about 0.40 millimeters.

5. The method of claim 4 wherein the second chamfer area dimension is disposed along the meshing surface and ranges from about 0.3 millimeters about to 0.7 millimeters.

6. The method of claim 5 wherein machining the plurality of radially and outwardly extending gear teeth into the gear tooth surface of the bevel gear is performed via a face milling process.

7. The method of claim 1 wherein machining the plurality of radially and outwardly extending gear teeth into the gear tooth surface of the bevel gear is performed via a face hobbing process.

8. The method of claim 1 wherein the brush is a metallic brush.

9. The method of claim 1 wherein the brush is a non-metallic brush with an abrasion component.

* * * * *